United States Patent [19]

Fiorino

[11] 3,864,583

[45] Feb. 4, 1975

[54] DETECTION OF DIGITAL DATA USING INTEGRATION TECHNIQUES

[75] Inventor: Benjamin C. Fiorino, Longmont, Colo.

[73] Assignee: International Business Machines Corporation, Armonk, N.Y.

[22] Filed: Apr. 23, 1973

[21] Appl. No.: 353,824

Related U.S. Application Data

[63] Continuation of Ser. No. 197,906, Nov. 11, 1971, abandoned, which is a continuation-in-part of Ser. No. 76,145, Sept. 28, 1970, abandoned.

[52] U.S. Cl. ............. 307/235 R, 307/232, 307/269, 328/36, 328/110, 328/151, 329/50, 340/347 DD

[51] Int. Cl. ..... H03k 5/18, H03k 5/153, H03d 3/18

[58] Field of Search ........... 307/208, 232, 235, 260, 307/261, 269, 242, 243; 328/34, 35, 36, 110, 112, 127, 139, 150, 151, 152; 329/50; 340/146.2, 172.5, 347 DD

[56] References Cited

UNITED STATES PATENTS

| | | | |
|---|---|---|---|
| 3,217,183 | 11/1965 | Thompson et al. | 307/262 X |
| 3,241,078 | 3/1966 | Jones | 329/50 |
| 3,268,824 | 8/1966 | Hinrichs | 328/165 |
| 3,349,389 | 10/1967 | Simanvicius | 340/347 |
| 3,386,041 | 5/1968 | Bell | 329/102 |
| 3,516,060 | 6/1970 | Hutton et al | 340/149 |
| 3,548,327 | 12/1970 | Vermeulen | 307/235 R X |
| 3,582,882 | 6/1971 | Titcomb | 340/146.2 |
| 3,624,529 | 11/1971 | Gebelein, Jr. | 329/104 |
| 3,641,447 | 2/1972 | Gaines et al. | 329/50 X |

*Primary Examiner*—Michael J. Lynch
*Assistant Examiner*—L. N. Anagnos
*Attorney, Agent, or Firm*—Herbert F. Somermeyer

[57] ABSTRACT

Data represented in digital signals are detected by integration techniques; each integration occurs over the entire detection or sample period. Recovery of each integration circuit occurs in a subsequent sample period. A pair of integration circuits forming one integrator are provided for each state of the digital signal with the integrators being alternately actuated. In a two-state signal, two integrators are provided; each integrates during a different signal state. To determine data contained in the signal, an amplitude comparison is made between the output of the analog-OR of each integrator of the several signal states. Also disclosed is an extremely sensitive comparator latch which utilizes the high gain of a switching circuit for enhancing amplitude comparison. A clocking system alternately actuating pairs of the integrators is also disclosed.

55 Claims, 7 Drawing Figures

DETECTION OF DIGITAL DATA USING INTEGRATION TECHNIQUES

RELATED PATENTS AND APPLICATIONS

This application is a continuation of U.S. application Ser. No. 197,906, filed Nov. 11, 1971, abandoned Apr. 24, 1973, which was a continuation-in-part of application Ser. No. 76,145, filed Sept. 28, 1970, and abandoned Dec. 28, 1971.

U.S. Pat. No. 3,818,501, filed Apr. 23, 1973, is a continuation-in-part having a parent common with the present application.

Thompson U.S. Pat. No. 3,217,183 and Simanvicius U.S. Pat. No. 3,349,389 disclose detection of data bit waveforms using integration techniques. Commonly assigned patent application Ser. No. 790,911, filed Jan. 14, 1969, now U.S. Pat. No. 3,548,327, discloses another data bit detection scheme using a plurality of integrators.

Additional U.S. Patents Cited in Parent Application

U.S. Pat. Nos. Titcomb 3,582,882 (340-146.2) and Hutton et al. 3,516,060 (340-149).

BACKGROUND OF THE INVENTION

The present invention relates to the detection of data represented in digital waveforms, particularly those waveforms usually associated with magnetic recording and communication systems.

Detection of data represented in multi-distinct state signals using integration techniques has many noise immunity advantages, as well as sensitivity enhancement, over detection schemes analyzing wavelengths. In many systems, the signal is limited to two distinct states respectively for representing ones or zeroes (NRZ). In the alternative, a change in signal state represents a one; while no change in state represents a zero (NRZI). Other data manifestations using multi-distinct state signals are known, such as phase-encoded (PE), ternary, double-frequency encoded (DFE or FM) and the like.

As the data bit rate increases, there is a corresponding increased requirement in sensitivity and reliability of the detection schemes. Integration techniques to date used for detection of data in distinct-state signal waveforms require a portion of the data bit detection period for recovery to a reference potential. As the data bit period decreases in duration, i.e., the data bit rate is increasing, for a given squelch or recovery time, the percentage of the bit period used for squelching increases. Therefore, it is highly desirable that an integration data detection system be devised that obviates the squelch problem.

SUMMARY OF THE INVENTION

It is an object of the present invention to provide an improved data detection scheme usable with a multi-distinct signal-state system, particularly wherein detection of data includes integration techniques. The detection of data is such that the squelch time of the integrators does not detract from integration time during any data detection or sample period.

An apparatus using the present invention and adapted to be used with a signal having two distinct states has two pairs of integration circuits. Each pair of integration circuits is termed an integrator. For a three distinct state signal system, three integrators are used. Within each integrator, the integration circuits are alternatively actuated during successively occurring detecting periods. Usually, duration of the detection period corresponds to a data bit period of the waveform being detected. Switching means derived from the data bit waveform alternately actuate the integration circuits in the respective integrators. Each integrator in the system detects that portion of the data bit period or detection period occupied by the signal having a given distinct signal state. The integrated signals are then combined for analyzing the data bit waveforms. In a preferred form, the output signals of the integration circuits of each integrator are combined in an analog-OR circuit. To analyze the data bit signal at the end of each sample period, the signals from each integrator are compared with the output signals of all other integrators.

According to one aspect of the invention, the squelch of the respective integration circuits occurs during the detection period immediately following each integration period. Squelch time is made substantially equal to the successive detection period. This arrangement maintains the output of the analog-OR circuit, and hence each integrator, at a relatively high value for a signal having the same distinct state during two successive detection periods.

In systems having high noise, a sensitive amplitude comparator detects small differences in integrated signals to detect data. According to the present invention, in the detection of a two-distinct-state signal, a cross-coupled Eccles-Jordan type of circuit or latch is used. During integration time, both active elements of the latch are disconnected from the power supply. The output of the analog-OR circuits is applied as base-input signals to the two active elements. At the end of each sample period, the power supplies are connected to the latch causing it to assume the stable state in accordance with the more positive analog-OR signal. Constant current sources power the discrimination circuit to further enhance detection repeatability.

According to another aspect of the invention, the input data bit waveform is supplied in a normal (+D) and complement (−D) form to respective integrators. A clock having a period equal to twice the data bit period (each one-half cycle equals a data bit period) selectively actuates integration circuits in the respective integrators. The clock supplies complementary clock signals. A first integrator is selectively actuated by plus-clock (+C) and minus-clock (−C) complementary clock signals for integrating only the positive portions of an input signal. In a similar manner, the negative portions (−D) of an input signal are integrated by a second integrator similarly actuated by the plus and minus clock signals. Integration is preferably in the same polarity. The analog-OR outputs of the integrators are then compared to determine which signal state occupied the greater portion of the sample period. In a system wherein the data bit waveform has more than two distinct states, there are separate signals supplied from the readback system to more than two pairs of data bit integrators.

GENERAL DESCRIPTION

Figures 1, 2, 4:
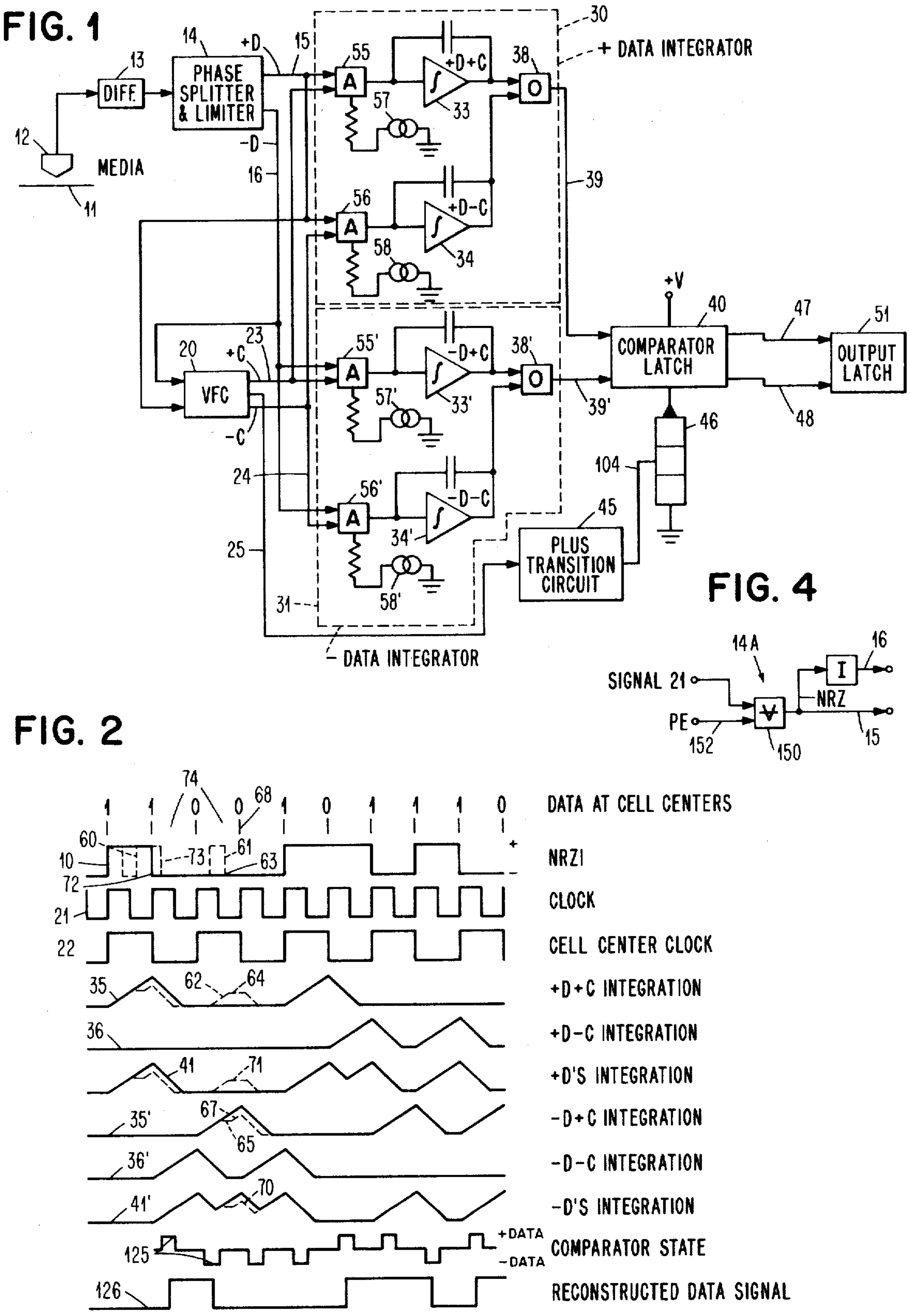
FIG. 1 is a simplified signal flow diagram showing one embodiment of the present invention.
FIG. 2 is a set of idealized signal waveforms used to describe the FIG. 1 illustrated system.
FIGS. 4 and 5 illustrate conversion of PE signals to NRZ and DFE signals to NRZI.

Referring now more particularly to the drawing, like numerals indicate like parts and structural features in the two diagrams. Data previously recorded on media 11 is sensed by a readback head 12. The readback signal is differentiated at 13, and then supplied to phase splitter and limiter 14. Included in differentiator 13 may be base line, peak shift, or other compensation circuits. Phase splitter and limiter 14 generates limited signal (+D) 10 from the readback signal and supplies same over line 15. The complement, i.e., polarity reversed, signal (−D) is simultaneously supplied over line 16. In both signals, a change in distinct state within a data bit period from plus to minus or vice versa indicates a binary one, while no change in state within the data bit period indicates a binary zero. By definition, the change in states or absence of such change in states occurs at second cell centers on media 11.

Signal 10 on line 15, as well as the complement signal on line 16 is supplied to VFC (Variable Frequency Clock) 20 for generating clock signals 21 and 22. Clock signal 21 has a period equal to the data bit period. As media 11 passes readback head 12, VFC 20 tracks the frequency variations caused by media velocity variations. Cell center clock signal 22 is derived from signal 21 and is supplied in complement 14 form over lines 23 and 24. The signal on line 23 is signal 22 and is referred hereinafter as a plus clock of a +C signal. The complement, i.e., polarity reversed, cell center clock signal appears on line 24 and is hereinafter referred to as the minus clock signal or −C signal. Signal 21 is supplied over line 25 to gate data signals from comparator latch 40, as will become apparent. Signal 21 is from a binary trigger (not shown) such as provided in the International Business Machines Model 2803 Tape Control Unit and referred to in Vermuelen, supra, as half-period generator 64. The output of half-period generator 64 is the differentiated change in state of a binary trigger. The use of binary triggers for frequency division in a clock or timing circuit is also shown by Featherston, U.S. Pat. No. 3,333,205; see his FIG. 1 illustrated divider-inverter 38. Additionally, binary trigger or triggered flip-flop 20BT responds to all transitions of signal 21 to frequency divide signal 21 by two, as is well known in the art, thereby supplying +clock and −clock signals, respectively, on lines 23 and 24 at one-half signal 21 pulse repetitive frequency.

The complementary clock and data signals are integrated and combined in data integrators 30 and 31. The relative output amplitudes of these two integrators indicate the polarity of signal 10 during the immediately preceding sample period. The sample period extends from cell center to cell center, no limitation thereto intended. Integrator 30 integrates the positive portions of signal 10 (+D signal). Integrator 31 effectively integrates the negative portions of signal 10 by integrating the positive portions of the complementary signal on line 16 (−D signal). Having both integrators operate with the same polarity signals, either clock or data, simplifies circuit design and increases reliability.

Since both integrators are constructed identically, plus-data integrator 30 is described with the same numerals primed being used in minus-data integrator 31. Each integrator has a pair of integration circuits respectively labeled +D+C, +D−C, −D+C, and −D−C. The labels indicate when the respective integration circuits are actuated to integrate linearly with time. +D+C integration circuit 33 integrates +D data signals 10 with +C clock signals 22. +D−C integration circuit 34 similarly integrates +D with −C signals. −D+C and −D−C circuits 33′ and 34′ operate with the −D data signal in the same way the two integration circuits in each integrator are successively and alternately actuated by the clock signals to integrate signal 10 during one of its distinct signal states. In this manner, the entire data bit period is usable for detection. No portion of the data bit period used in detection integration need be used for squelch. Using a substantial portion of the next succeeding detection period permits a slow squelch or integration recovery. This action reduces the frequency requirements on the squelch circuit, reduces noise possibilities, and enables a smoother output from integrators 30 and 31.

Signal 35 is the output of integration circuit 33. It has a positive-going voltage ramp each time signals 10 and 22 are both positive (+D+C). Similarly, signal 36 is the output of integration circuit 34 and has a positive voltage ramp for +D−C. Signals 35′ and 36′ relate to circuits 33′ and 34′ in the same manner for −D+C and −D−C signal combinations. The outputs of circuits 33 and 34 are analog-OR'd in circuit 38 with the analog-OR result signal supplied over line 39 to later-described comparator latch 40. An analog-OR circuit passes the larger amplitude signal of all input signals of a given polarity (positive in the illustrated circuit). Line 39 carries signal 41 while line 39′ carries signal 41′. Signal 41 has a positive amplitude equal to the more positive amplitude signal 35 or 36.

Integration circuit 33 recovers (squelches) to its reference state during negative portions of cell center clock signal 22 while circuit 34 recovers to its reference signal state during positive portions of cell center clock signal 22. Also, note that the recovery time requires a substantial portion of each next successively occurring sample period, for example 75 percent of a sample period. Such sample period preferably equals the duration of a bit period on media 11. The reference signal state may be clamped as suggested by Korn and Korn in "Electronic Analog Computers," Pages 411 and 412, 1956, McGraw-Hill, Library of Congress Number 56-8176.

Sample time, i.e., detection of data, occurs immediately following each sample period, i.e., at each cell center. Sample time is defined by the positive-going transitions in clock signal 21. Plus-transition circuit 45 responds to such positive-going transitions to actuate gate transistor 46 to current conduction for a short period of time. This turns the comparator latch 40 on, which effects detection as will later be described. At all other times, gate transistor 46 is current nonconductive disabling comparator latch 40. This selective actuation of comparator latch 40 produces signal 125 on line 47 and its complement signal on line 48.

Selective actuation of integrator circuits 33 and 34, as well as the signal recovery (squelch) during successive alternate detection periods, is now described. A pair of special AND circuits 55 and 56 is respectively jointly responsive to the line 15 and line 23 signals and to the line 15 and line 24 signals to supply constant amplitude signals to integrator circuits 33 and 34. Such special AND circuits are later described with respect to FIG. 3. These constant amplitude signals enable integration circuits 33 and 34 to integrate at a linear rate to effect reliable indication of the duration of each distinct signal state of signal 10 in each sample period. When the cell center clock signals on lines 23 and 24 are respectively in their negative signal states, AND circuits 55 and 56, as will be later described, electrically connect constant current sources 57 and 58 respectively to the input portion of integration circuits 33 and 34. These current sources cause the integrator circuits to recover toward a reference potential at the given rate illustrated in the FIG. 2 idealized waveforms. On reaching the reference potential, the constant current sources are no longer effective. When cell center clock signals are positive and the data signal on line 15 is negative, there is no input signal supplied to integration circuit 33. Rather, a high impedance is presented thereto such that it holds its presently integrated voltage amplitude. This is shown in the FIG. 2 signals at 64, 65, and 71.

The ability to hold a given integrated signal during a sample period is useful in obviating peak shift and base-line recovery errors in signal 10. Dotted lines 60 and 61 in signal 10 illustrate base-line recovery caused by peak-shift compensation, as is well known. Referring now to signal 35, when signal 10 goes positive, i.e., recovers its base line as at 61, integration occurs in circuit 33. This is shown by sloped line 62. However, when signal 10 returns to its negative value at 63, the integrated amplitude in circuit 33 is held as indicated by flat portion 64. Integrator circuit 33' is similarly affected. As soon as signal 10 goes positive at 61, circuit 33' no longer integrates but holds its integrated value as at 65. Upon signal 10 returning to its negative state at 63, integrator circuit 33' continues to integrate as shown at 67.

At the next occurring cell center 68, the amplitudes of signals 41 and 41' are compared. Since signal 41' has the greater amplitude at 70 than signal 41 has at 71, minus data (−D) is indicated. This results in no change in the signal state indicating that a binary zero has been recorded at cell center 68. Please note that the amplitude difference between signals 41' and 41, because of the base-line recovery error 61, decreases. A similar problem occurs when the NRZI signal 10 is peak shifted. That is, the transition, such as transition 72, does not occur at the cell center; rather, it is shifted as indicated by dotted line 73. The present detection scheme distinguishes and overcomes such peak shift up to, but not including, the cell boundaries as at 74. This corresponds to a 50 percent peak shift which is not expected in most recording schemes. A typical peak shift is 25 percent as shown by dotted line 73. Phase error may be indicated when the output amplitudes of analog-OR's 38 and 38' are approximately equal in amplitude.

DESCRIPTION OF THE ORIGINALLY PREFERRED CIRCUITS

Figures 3, 5:
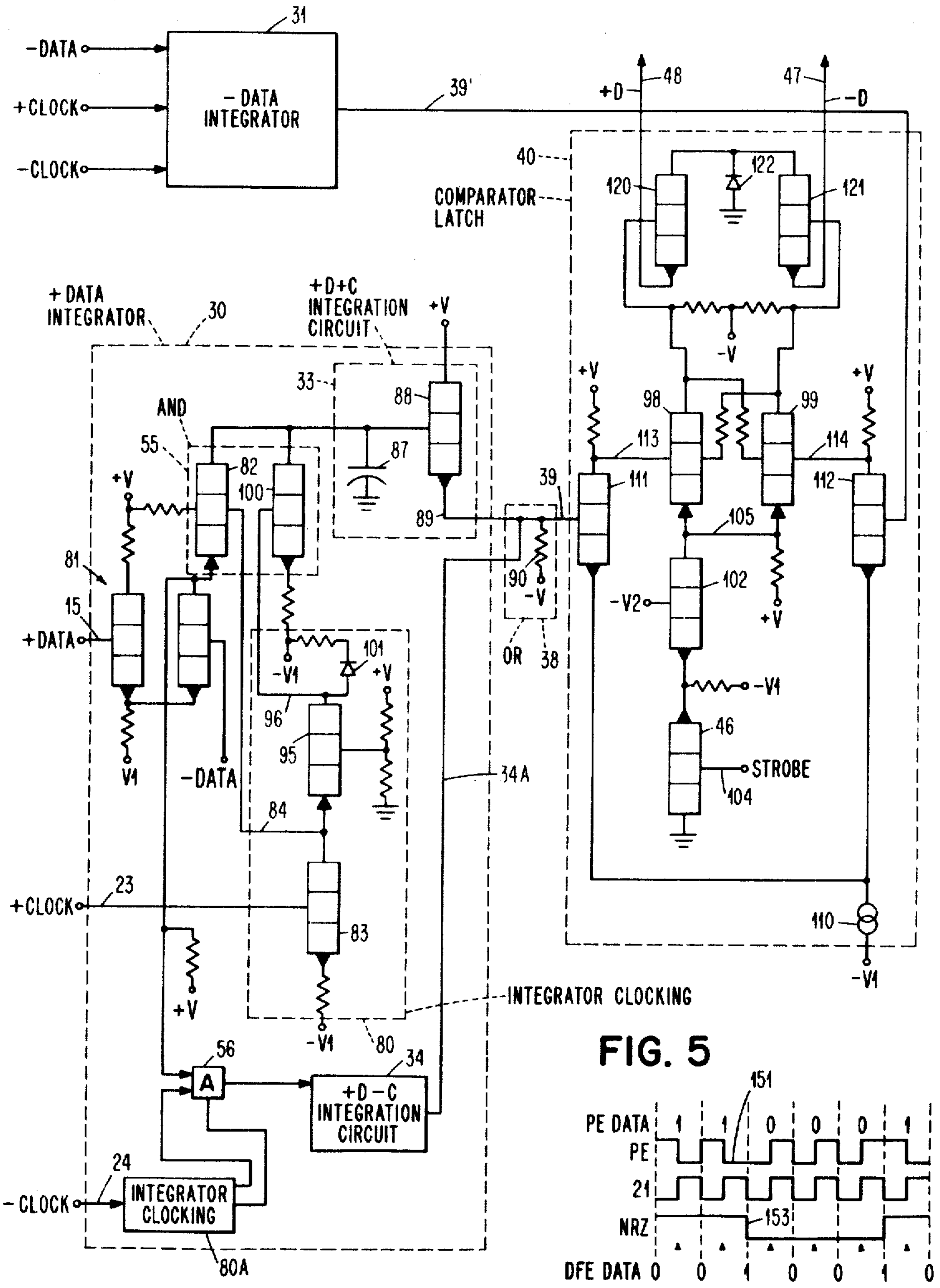
FIG. 3 is a combined block-schematic diagram of data integrators usable in the FIG. 1 illustrated system.

To attain such signal error insensitivity, a relatively sensitive amplitude comparator is provided as well as linear and identical integrators. FIG. 3 shows in schematic form a preferred linear data integrator with a preferred sensitive comparator latch. Again, +D integrator 30 is described in detail, it being understood that −D integrator 31 is constructed in a like manner.

+D integrator 30, special AND circuit 55, together with integrator clocking (not shown in FIG. 1) 80 and details of +D+C integration circuit 33, are described. Integration circuit 34, special AND circuit 56, and integrator clocking circuit 80A are shown in block form. Data signals 10 on line 15 are supplied through amplifier or inverter circuit 81 to AND circuit 55 as an emitter input to transistor 82. Explanation of such a circuit is found in "Introduction to Integrated Semi-Conductor Circuits," by Khambati, Pages 116, 117, John Wiley & Sons, Inc. 1963, L. C. Card Number 63-22760. Integrator clocking circuit 80 switches transistor 82 to the current conductive state for passing a constant amplitude signal from amplifier 81 to circuit 33. Circuit 80 receives +C signal on line 23 as a base input to gate transistor 83. Whenever the signal on line 23 is positive, transistor 83 is current conductive causing the amplitude potential on line 84 to be clamped to relatively negative potential −V1. This relatively negative potential causes transistor 83 to be current conductive as determined by the voltage potential on line 84. The constant-current output signal from transistor 82 is directly connected to integrating capacitor 87 and linearly charges same.

In circuit 33, transistor 88 has its base electrode connected to capacitor 87 for supplying a continuous output through its emitter to line 89. Analog-OR circuit 38 receives signals from lines 89 and 34A of +D−C integration circuit 34. Analog-OR circuit 38 passes the more positive signal from lines 89 and 34A to comparator latch 40. In analog-OR 38, resistor 90 is connected to −V potential such that the more positive signal from either of the integrator circuits determines the voltage drop thereacross; and, hence, the more positive amplitude is on line 39.

Integrator clocking circuit 80 also squelches integration circuit 33 during the next succeeding detection period. That is, when +C signal on line 23 goes negative, transistor 83 becomes current nonconductive. This action makes line 84 relatively positive for biasing transistor 95 to current conduction. A fixed bias potential is supplied to the base electrode of transistor 95. The collector of transistor 95 is connected via line 96 to squelch transistor 100 in AND 55. Capacitor 87 discharges through transistor 100 to supply −V1 at a constant rate. Diode 101 is connected across the base-emitter portion of transistor 100 to form a well-known constant-current connection. The discharge or squelch rate is determined by the impedance of the emitter resistor of transistor 100. Constant-current source 85 may consist of a diode connected to transistor 83 in the same manner; that is, a diode may be connected from line 23 through a resistor to −V1.

The analog-OR sum signal on line 39 is supplied on one input of comparator latch 40. In a similar manner, the analog-OR sum signal from −D integrator 31 is supplied over line 39' to the opposite input. The comparator latch is similar to the one published by Gene Clapper in the IBM TECHNICAL DISCLOSURE BULLETIN, February 1964, on Page 69. The present comparator latch provides certain improvements in repeatability and enhanced sensitivity.

The cross-coupling portion of latch 40 includes two active element transistors 98 and 99. The emitter electrodes of these two transistors are connected together at 105 and to the collector of transistor 102. Transistor 102 is in the common-base configuration for enhancing frequency response. The emitter of transistor 102 is connected to −V1 via a suitable resistor. Gate transistor 46 is in the grounded-collector configuration and emitter drives common-base connected transistor 102. Transistor 46 is held to a current nonconductive state by a relatively negative signal on line 104. For sampling, circuit 45 (FIG. 1) supplies an actuating pulse over line 104 turning transistor 46 on for activating comparator latch 40.

Before sampling, the emitter electrode of grounded-base transistor 102 is at a relatively negative potential making it current conductive. This action clamps the common emitter connection 105 to a relatively negative potential making both transistors 98 and 99 current nonconductive. The active elements of latch 40 are used in a reversed-bias condition to make latch 40 nonresponsive to input signals. At sample time, i.e., immediately after each cell center, the signal on line 104 is changed making transistor 46 current conductive. This action makes transistor 102 current nonconductive. Connection 105 becomes positive such that transistors 98 and 99 immediately respond to the analog voltages on lines 39 and 39' to assume a stable state in accordance with the more positive input amplitude.

A particular input gating circuit to latch enhances sensitivity of the comparison function. Constant-current source 110 is connected to the emitter of latch-input transistors 111 and 112. Signals on line 39 and 39' respectively are transferred through these two transistors to the base electrodes of transistors 98 and 99. Constant-current source 110 being connected commonly to the emitters of latch-input matched transistors 111 and 112, enables a precise current division therebetween. Then the voltage amplitudes on the two lines 39 and 39' are precisely compared. Accordingly, the transferred signals to input lines 113 and 114 are in accordance with the integrator output signal amplitudes. Any drift in constant-current amplitude of source 110 is equally reflected on both sides of the input. By selecting the transistors 111 and 112 for temperature characteristics, any drift in temperature will be compensated since the two transistors are differentially connected.

The output circuitry of comparator latch 40 includes matched transistors 120 and 121 having a common collector connection to supply diode 122. The collectors of the latch transistors are connected to the base electrodes of transistors 120 and 121. If the +D input on line 39 is greater in amplitude than the −D signal on line 39', transistor 98 becomes current conductive. A relative positive voltage appears at the base electrode of transistor 120. Correspondingly, a relative positive voltage is supplied to the base electrode of transistor 121 making it more current conductive. Ground reference potential is supplied via diode 122 and transistor 121 to line 48. In a similar manner, if the amplitude on line 39' is more positive than the amplitude on line 39, a reverse operation is effected. The resultant signal 125 on line 47 results from the just-described action. The pulse portions of signal 125 correspond to strobe pulses on line 104, the positive pulses appearing on either line 47 or 48 in accordance with the integrator output signal amplitudes.

Referring now to FIG. 2, it is seen that a positive or negative comparator state occurs only for a portion of each sample period. The gated signal state of comparator latch 40 sets and resets output latch 51 in accordance with the comparator latch signal state, thereby reconstructing the input data waveform 10, as data signal 126. The usual data conversion circuits for reconverting waveform 126 to other data-representing signals is well known and not discussed for that reason. It should also be remembered that input signal 10 is shown in idealized form. In the practical system, the binary 1 indicating transition could appear at the exact cell centers only in a string of ones, with peak shift causing the transitions to appear between the idealized cell centers.

The FIG. 1 illustrated system is adapted for PE or DFE by adding an EXCLUSIVE-OR function to circuit 14. As shown in FIG. 4, EXCLUSIVE-OR circuit 150 receives PE input signal 151 over line 152. This signal has been differentiated and limited in a known manner. Signal 21 from VFC 20 is supplied to the other input. From inspection of the signals shown in FIG. 4, the EXCLUSIVE-OR of signals 151 and 21 produce NRZ signal 153. The FIG. 1 circuit then detects NRZ data signal 153 as supplied over line 15 and the complement (−D) signal supplied over line 16.

If signal 151 is DFE, i.e., cell boundaries are indicated by the carets which correspond to cell centers of PE, then the EXCLUSIVE-OR output signal is NRZI. Detection of NRZI follows the same procedure as for NRZ, except the interpretation of reconstructed signal 126 is changed.

The present invention is also applicable to detection of RZ (Return to Zero), FSK, and other data-representing signals. Modifications, such as described for PE and DFE, may be necessary to detect various types of signals without detracting from the fundamental concepts of this invention.

DESCRIPTION OF THE LATER PREFERRED CIRCUITS

Figure 6:
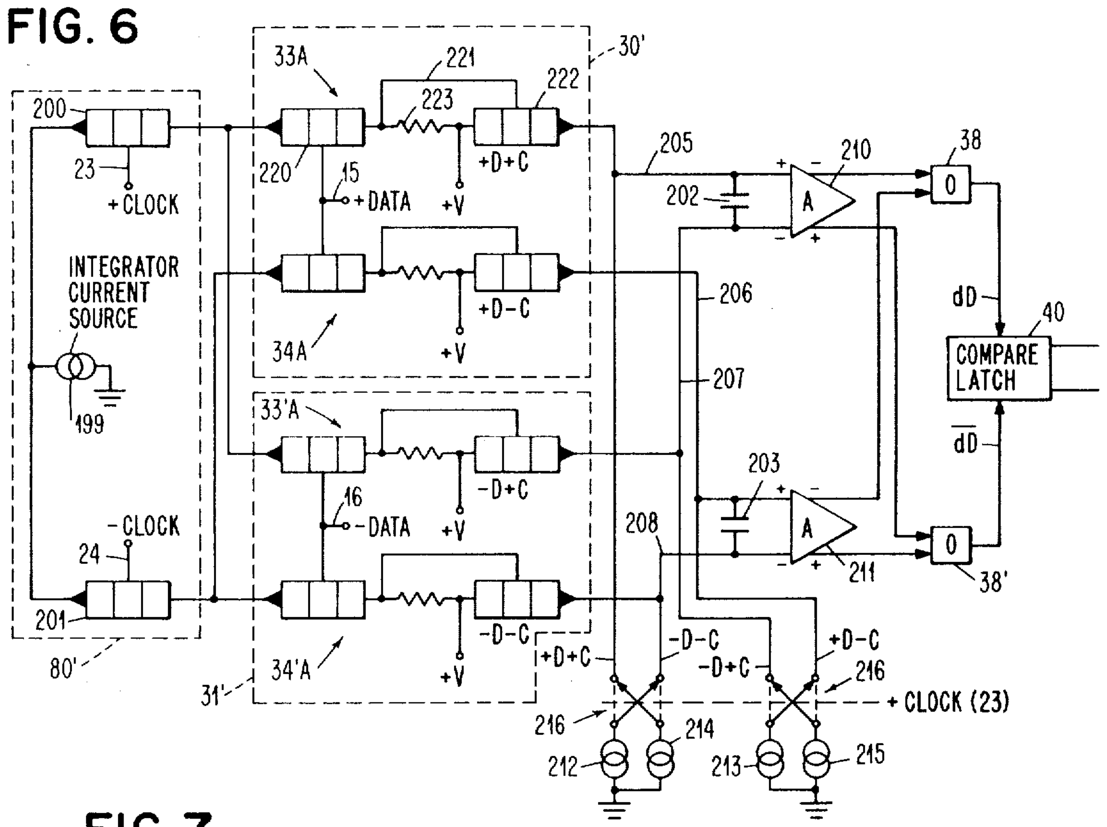
FIG. 6 is a simplified diagram of a further improvement of the invention.
Figure 7:
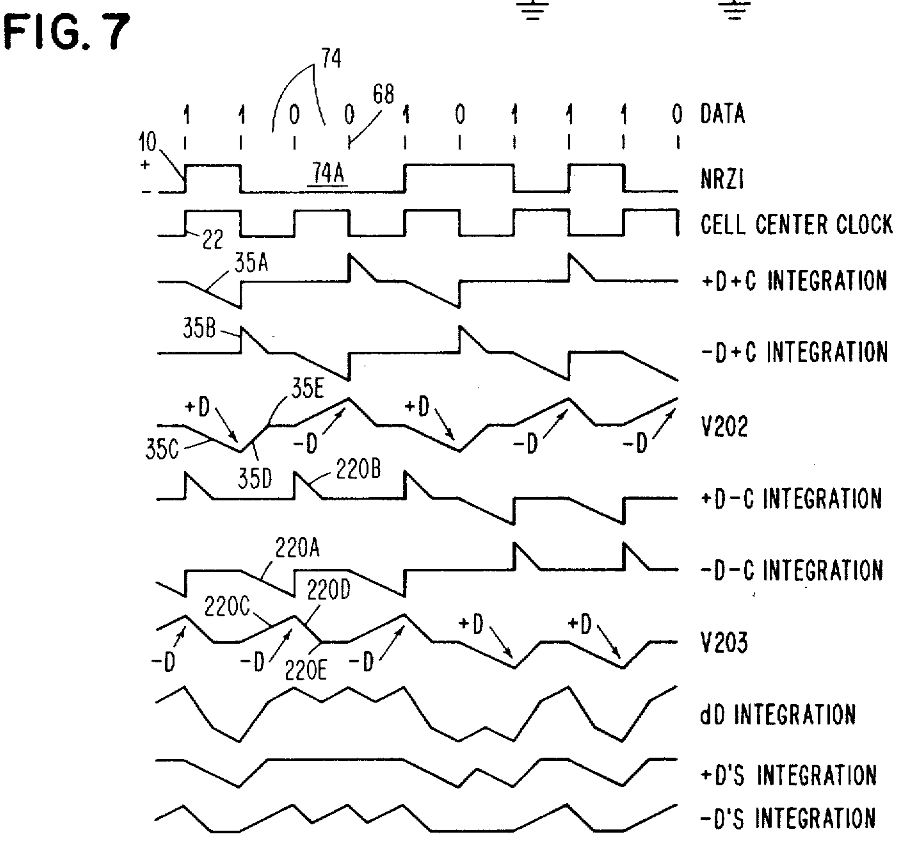
FIG. 7 shows a set of idealized signals illustrating operation of the FIG. 6 apparatus.

Referring to FIGS. 6 and 7, a simplification of the circuits illustrated in FIGS. 1 and 3 is shown. Salient differences between FIG. 6 and the originally preferred circuits are time sharing of the integrating capacitors, time sharing of current sources, simplification and using only NPN-type semi-conductive devices. The FIG. 6 illustrated apparatus is more easily incorporated into a semiconductor integrated circuit chip than the originally preferred circuits. The broad inventive concepts set forth in FIGS. 1 and 3 still appertain to the FIG. 6 arrangement as will become apparent from the following description. Additionally, integrator clocking for effecting synchronous demodulation is greatly simplified and more reliable. Differential techniques enhance circuit operation.

Single clocking circuit 80' provides a clocking signal for both modified integrators 30' and 31' corresponding favorably to the plus and minus data integrators of FIG. 1. The integrated signals for both integrators are stored in capacitors 202 and 203 on a time-shared basis. Capacitor 202 is differentially connected between line 205 of +D+C integration circuit and line 207 of −D+C integration circuit. In a similar manner, storage capacitor 203 is differentially connected between line 207 of +D−C integration circuit and line 206 of −D−C integration circuit. Notice that the differential connection is between integration circuits actuated by the same clock phase but of opposite polarity data signals. The general mode of operation is that during one cycle or first bit period, the +D+C integration circuit integrates its signal into capacitor 202, while line 207 acts as a reference potential. During the next successive integrating or sample period, line 205 becomes a reference; and line 207 receives the integrating signal of the −D+C integration circuit. Because of the time sharing involved with the current sources, as will become apparent, the actual electrical current that is integrated does not actually flow through the integrators 30' and 31'. Those circuits control, as an electronic switch, the integrations performed in capacitors 202 and 203 on a time-shared basis.

The output signals of the integration circuits are supplied through high-input impedance differential amplifiers 210 and 211 respectively to the analog-OR circuits 38 and 38' which may be electrical connections or "dot OR's" of the output portions of amplifiers 210 and 211. Analog-OR's are, in turn, connected to compare latch 40 as shown in FIG. 1. The signal input to latch 40 is dD integration signal from OR 38 and the inversion of same from OR 38' (a differential or double-ended signal).

The actual integrating signals and squelch signals for integrators 30' and 31' are respectively supplied by current sources 212, 213 and 214, 215 in successive sample periods by reversing switches 216. During a first one of the successive periods, as shown by the switches 216 solid lines, the integrating currents are supplied by current sources 214 and 215, respectively, to lines 205 and 207; while squelch currents are simultaneously supplied by sources 212 and 213 to lines 208 and 206. During the second or successive one sample period, represented by the dotted line connections in switches 216, the reversing switches 216 reverse the connections such that integrating current sources 214 and 215, respectively, supply integrating currents to lines 208 and 206; while sources 212 and 213 supply squelch currents, respectively, to lines 205 and 207.

The arrangement provides a synchronous demodulator in that +C (plus clock signal) on line 23 not only actuates reversing switches 216 for supplying the integrating currents, but also times the operation of the integration circuits via circuit 80' by alternately actuating transistors 202 and 201 to divert current from source 199, respectively, to two different sets of the same clock-phase integration circuits. Clock transistor 200 is responsive to the +C on line 23 to become current conductive whenever +C is positive. Current flow is then from source 199 through the clock transistor 200, thence to integration circuits 33A and 33'A. In circuit 33A, switching transistor 220 is responsive to a +D (+data signal) on line 15 to become current conductive. When current conductive, a relatively low voltage is supplied at its collector via collector resistor 223. Then, a low voltage on line 221 causes integration control transistor 222 to become current nonconductive. When it is current nonconductive, integrating current supplied to line 205 from source 214 via a reversing switch 216 flows into integration storage capacitor 202. If +D is negative on line 15, then integration controlling transistor 222 is current conductive diverting all of the current from source 214 to its collector supply. All of the other integration circuits 34A, 33'A, and 34'A operate in an identical manner with respect to the clocking circuit 80', the data signals, and the current sources 212–215 as can be determined by examining FIG. 6.

For establishing a more clear understanding of the interrelationship of the integration circuits, the integration storage capacitors 202, 203, and the current sources for supplying synchronously demodulated signals through analog-OR's 38 and 38' to latch 40, reference is made to FIG. 7 wherein like numbers indicate identical signals and timings as shown in FIG. 2 and as previously described with respect to FIG. 1 and FIG. 3. Signals 125 and 126 of FIG. 2 are omitted in that they are identical for both embodiments.

The same data pattern is used in both FIGS. 2 and 7 for more clearly showing the functional interrelationships between the two embodiments. NRZI data signal 10 is received from media 11 (FIG. 1), phase split in circuit 14, and supplied as +D and −D signals on lines 15 and 16, respectively. FIG. 6 picks up the complementary data signals on the +D and −D terminals in the same manner as the integration circuits in FIG. 1. Cell center clock signal 22 repeated in FIG. 7 shows the timing relationships. Clock signal 21 is also used for operating compare latch via gating transistor 46 as previously described. The +D+C integration signal in FIG. 7 is somewhat different from the +D+C integration signal of FIG. 1 because of the differential connection of the integration storage means. During a first timing period, +D+C integration signal at 35A transfers current from current source 214 to capacitor 202. At the end of the period, the cell center clock reverses, causing transistor 200 to be nonconductive and clocking transistor 201 to be current conductive. This substantially simultaneous action makes the transistor 220, and its corresponding part in 33'A, current nonconductive. This action causes line 221, and the corresponding line in 33'A, to become relatively positive causing integration control transistor 221 to become current conductive. When it is current conductive, it establishes a reference potential on line 205. This is a rapid change from the integrated peak value 35A. Because of the substantially instantaneous change, the charge on capacitor 202 is represented as a rapid voltage change in the −D+C integration circuit, as shown at 35B. This voltage is then dissipated from capacitor 202 by constant current from source 213 at a rate twice the integration rate of the integrating current sources. The voltage across capacitor 202 is shown as V202 in FIG. 7. Notice that the negative-going excursion 35C corresponds to a +D integration between the first two successive ones in the data pattern.

Capacitor 202 is discharged to a reference potential at time 35E in accordance with the slope 35D. Slopes at 35B and 35D are identical. Polarity of the signal across capacitor 202 is measured positive from line 205 to line 206. During the next successive period at 74A, the −C integration circuits are activated. Accordingly, transistors in integration circuits 34A and 34'A are current conductive allowing the D signals on lines 15 and 16 to control the conductivity of the respective integration control transistors. When those control transistors are nonconductive, integration currents flow into the storage capacitors representing the relative data polarity at −C time. This is shown in FIG. 7 as integration as 220A on capacitor 203, which is a −D integration. The discharge in the third successive period is at 220C with the discharge being completed at 220E. The voltage across capacitor 203 is shown as signal 220D with positive polarity being measured from line 206 to line 208.

Interaction of the capacitors, current source integration circuits, and the C signal can be further analyzed by studying the waveforms in FIG. 7. For convenience of the reader, the +D and −D integration excursions of the capacitors and the dD integration signal are respectively labeled as +D and −D which follow the signal excursion of NRZI signal 10. Note that integration occurs alternately with respect to capacitors 202 and 203 as can be seen by examining the signals V202 and V203 and observing the +D and −D symbols.

The transfer of voltage potential from one side of a capacitor 202 or 203 to the other side permits squelching or discharging the capacitor to a reference potential during a next successive cycle without requiring four capacitors. Note that in the event of noise, the recovery of the capacitor to a reference potential would be diminished in the same manner as that shown in FIG. 2 with respect to noise signals 60 and 21 and phase shift 73. Such perturbations in the integration and discharge of capacitors 202 and 203 are not shown in FIG. 7.

Analog-OR circuits receive the integrated signals from the same integration circuits as that set forth in FIG. 1 via amplifiers 210 and 211. The signals passed by analog-OR's 38 and 38' are the differential signals on capacitors 202 and 203, labeled as dD integration signals. That signal dD integration is obtained by current summing V202 and V203 for 38 and inverting (differential action) same for 38'.

For convenience in comparing circuit action with FIG. 1, the +D's and −D's integration signals are shown. These signals were not measurable in the constructed embodiment because of carrying the differential signal handling clear through to latch 40. Note that the +D's and −D's integration signals are substantially the same as that shown in FIG. 2, except that the polarity of the +D's integration signal is inverted.

From the above description, it is seen that the integration circuits 33A, 34A, 33'A, and 34'A alternately by current nonconductance enable a current source to either squelch or integrate a signal in the capacitors 202 and 203. During squelch times, the integration controlling transistor is always current conductive establishing a reference potential on one side of the complementary connections, i.e., lines 205–208 of the capacitors enabling the other side of the capacitor to perform the squelch function via the squelch current sources. The effect of noise on this circuit is substantially the same as that shown for the circuit of FIG. 1 in that the relative charges on capacitors 202 and 203 will be modified in accordance with the received noise.

The FIG. 6 illustrated circuit can be used anyplace as the FIG. 1 illustrated circuit and vice versa. An interesting aspect of the FIG. 6 illustrated circuit is that it behaves much like a synchronous demodulator in that the clocking circuit 80' alternately actuates complementary integration controlling circuits 33A, 33'A, 34A, and 34'A to alternately, in successive cycles, evaluate the received D signals on lines 15 and 16.

It is apparent that the signals on lines 15 and 16 need not come from the common source such as phase splitter 14 of FIG. 1. Rather, two independently generated signals may be supplied thereto for synchronous demodulation by clock circuit 80'. The source of the +C and −C signals should be the same if the D signals are being supplied to circuits 30' and 31'. On the other hand, lines 15 and 16 may receive clocking signals; i.e., the synchronizing portion of the demodulation may be applied to circuits 30' and 31' rather than to the clocking circuit 80'. Then, the data can be supplied respectively to transistors 200 and 201. The connections of reversing switch 216 may be changed to accommodate the above-mentioned reverse connections and still accomplish the purposes and results of the present invention.

It is seen in FIG. 6 that the clocking circuit portions 200 and 201 respectively apply to both integrators 30' and 31' for applying the +C and −C respectively to both circuits. Accordingly, the +D and −D signals are synchronously demodulated in accordance with both phases of the clock as may be effected by noise as shown in FIG. 2.

While the invention has been particularly shown and described with reference to a preferred embodiment thereof, it will be understood by those skilled in the art that various changes in form and details may be made therein without departing from the spirit and scope of the invention.

What is claimed is:

1. A data detector, including in combination:

means for receiving an amplitude-limited signal having first and second signal states;

timing means responsive to said limited signal to generate a clock signal indicative of pairs of first and second successive sample times for said limited signal;

first, second, third, and fourth integration means each supplying an integrated signal, said first and second means being responsive to said clock signal respectively during said first and second sample times to integrate said limited signal only when said limited signal is in said first signal state, said third and fourth integration means being responsive to said clock signal to integrate said limited signal only when said limited signal is in said second signal state, respectively during said first and second sample times, each of said integration means being respectively nonresponsive to said limited signal at all other times;

reference signal recovery means in each said integration means for altering the integrated signal therein when the respective integration means are nonresponsive to said limited signal for altering each integrated signal toward a reference signal value;

separate means for combining said integrated signals from said first and second integration means and for combining said integrated signals from said third and fourth integrator means; and output means responsive to said combined signals for indicating data in accordance with the signal relationships therebetween.

2. The subject matter of claim 1 wherein said recovery means alters the integration means signal state at a rate such that a substantial portion of one of said sample times is required for said alteration.

3. The subject matter of claim 1 wherein said clock signal has first and second signal states respectively indicating said first and second successive sample times;

integrator clocking means electrically interposed between said timing means and each integration means for selectively activating same in accordance with the signal states of said clock signal, a first integrator clocking means being responsive to said clock signal to actuate said first and third integration means to receive said limited signal and to respectively integrate said first and second signal states thereof and simultaneously actuating said second and fourth integration means to alter the integrated signals therein toward a reference state during substantially all of said first sample times; and said integrator clocking means being further responsive to said clocking signal being in said second signal state to cause said second and fourth integration means to be responsive to said limited signal and simultaneously causing said first and third integration means to alter the integrated signal toward a reference signal state during substantially all of said second sample time.

4. The subject matter of claim 3 wherein said integrator clocking means has a pair of constant current sources for each integration means, said constant current sources supplying a constant drive current to each of the respective integration means for providing linear ramp integration based upon duration of said first and second signal states within said limited signal during the respective sampling times.

5. The subject matter set forth in claim 1 wherein said output means includes an amplitude voltage comparator responsive at predetermined times within said sample times to same combined signals for providing a binary output signal for indicating which of the two combined signals has the larger amplitude.

6. The subject matter set forth in claim 5 wherein said comparator means includes a bistable latch having first and second inputs for respectively switching the latch between first and second stable signal states;

strobe means connected to said latch for selectively biasing said latch to an inactive circuit condition and further biasing said latch to an active circuit condition for a short period of time at the beginning of each of said sample times such that the combined signals bias the first and second inputs respectively for causing said latch to rapidly switch to one of said first or second signal states during said short period.

7. The subject matter set forth in claim 6 further including a constant current source in said output means, a pair of emitter followers electrically interposed between said combining means and inputs to said latch and being supplied emitter current by said output means constant current means such that sensitivity of the comparator means to the differences between amplitudes of said combined signals is enhanced.

8. The data detector set forth in claim 1 further including first and second integrated signal storage means respectively differentially coupled between said first and third and said second and fourth integration means for alternately storing integration signals therefrom, respectively.

9. The data detector set forth in claim 8 including two pairs of reversably switched current sources, current sources in said pairs being switchable between said differential connection of each said storage means, respectively, and one of said current sources in each pair being time shared by two of said integration means, respectively, as said reference signal-state recovery means.

10. The data detector set forth in claim 8 further including a constant current source; and wherein said timing means includes a pair of alternately actuated solid-state switching means respectively electrically interposed between said first and third, said second and fourth integration means, and said constant current source.

11. The data detector set forth in claim 10 wherein each integration means includes a first semiconductive switch means having a data signal receiving connection for respectively receiving said limited signal, and a second emitter-follower configured semiconduction switch means having a control connection to the respective first switch means and an emitter portion respectively connected to said storage means for establishing said differential coupling.

12. The data detector set forth in claim 1 wherein said integration means each includes transistor switch means jointly responsive to said clock and to said data for assuming current conductive and nonconductive states in accordance with the relationship between the clock and said data, and having an output terminal reflecting said conductive state;

first and second capacitor means connected across output terminals of said integration means respectively actuated by the same clock phase, said first and third and said second and fourth integration means respectively;

current source means for exchanging current of a first amplitude for providing an integration signal;

second current source means comprising said reference state signal recovery means for exchanging electrical current for recovering said capacitors from an integrated charge;

reversing switch means in said reference state recovery means and said integration means selectively and alternately switching said first and second current source means between the output terminals of said first and third and said second and fourth integration means such that capacitor means alternately exchange integration currents respectively with said first and second or said third and fourth integration means and with said signal-state recovery means;

high-input impedance amplifier means connected to each of said output terminals; and said separate means receiving signals from said amplifier means.

13. Predetection integration for use with amplitude limited signals, a first-limited signal being supplied along a first line and a second limited signal being supplied along a second line;

timing means responsive to one of said limited signals for generating a clocking signal having first and second signal states of respective durations substantially equal to predetermined durations of corresponding first and second signal states of said one limited signal;

first integration means jointly responsive to said first limited signal being in a first signal state and to said clock signal being in a first signal state to integrate time duration of said limited signal being in said first signal state and being further responsive to said clock signal being in a second signal state to alter the integrated signal toward a reference state at a rate slightly greater than said rate of integration;

second integration means jointly responsive to said first limited signal being in said first signal state and to said clock signal being in said second signal state to integrate the duration of said limited signal being in said first signal state and being further responsive to said clock signal being in said first signal state to alter the integrated signal toward a reference value at a rate sightly greater than the rate of integration;

third integration means jointly responsive to said second limited signal being in a second signal state and to said clock signal being in said first signal state to integrate the duration of said second limited signal being in said second signal state and being further responsive to said clock signal being in said signal state to alter the integrated signal toward a reference state at a rate slightly greater than the rate of integration;

fourth integration means jointly responsive to said second limited signal being in said second signal state and to said clock signal being in said second signal state to integrate the duration of said limited signal being in said second signal state and being further responsive to said clock signal being in said first signal state to alter the integrated signal toward a reference state at a rate slightly greater than the rate of integration; and signal combining means respectively combining the integrated signals from said first and second integration means for supplying a first combined signal indicating duration of the first signal state in said first limited signal and further combining integrated signals from said third and fourth integrator means for supplying a second combined signal indicating the duration of said second limited signal being in said second signal state.

14. The subject matter set forth in claim 13 further including voltage comparison means including bistable means jointly responsive to said combined signals for setting the bistable means to a first signal state when the first combined signal has an amplitude greater than the second combined signal and to the second signal state in the reverse situation, a change in the stable states of bistable means indicating that said limited signals have changed signal states.

15. The subject matter set forth in claim 14 wherein each of said integration means includes a constant current source, a transistor device connected in grounded-base configuration having a collector electrode and an emitter electrode, said emitter electrode for receiving said limited signal for passing same whenever a constant current is received, an integrating capacitor in each of said integrators being connected to the collector of said grounded base transistor device; and recovery circuit means connected to said capacitor respectively in each of said integration means for causing current transfer at a rate greater than that provided by said grounded base transistor device and in the direction causing a recovery of said capacitor charge toward a reference value.

16. The subject matter set forth in claim 15 wherein each integration means includes an input-gate transistor having a base connection receiving said clock signals, respectively, and having a collector electrically connected to each base electrode of said grounded-base configuration transistor devices for clamping same to an off condition in response to said clock signal respectively and when current nonconductive preventing a constant-current flow to said base electrode.

17. The subject matter set forth in claim 14 wherein said voltage-comparison means has first and second transistor means cross-coupled to form said bistable means, said first and second transistor means having emitter electrodes connected together and with collector electrodes forming output connections;

a strobe circuit for said voltage-comparison means comprising grounded-base transistor means having a pair of current passing electrodes one of which is connected to said commonly connected emitter electrodes and the other of which is for receiving a strobe signal;

strobe means responsive to said timing means for selectively supplying said strobe signal for actuating said strobe circuit to a given current-conductive state;

voltage-actuating means connected to said common emitter means and operative when said strobe circuit is in said given current-conductive state to effect current flow through said first and second transistor means such that said latch is in an active state for being responsive to inputs supplied from said signal combining means, and being further operative when said strobe circuit transistor is not in said given current-conductive state bias said first and second transistor means to be current nonconductive.

18. The subject matter of claim 17 further including a pair of output transistor means having collector electrodes commonly connected together and a base electrode respectively connected to the collector electrodes of said first and second transistor means and emitter electrodes being output connections, unidirectional current-conducting means connected between a reference potential and said commonly-connected collectors, and a pair of gating means connected to said output emitter connections and receiving signals from said timing means for selectively actuating said gating means at least during the period of time said strobe circuit is in said given current-conductive state.

19. The subject matter set forth in claim 18 further including a differential amplifier having two transistor means respectively receiving said first and second combined signals and having emitter electrodes commonly connected together;

a constant-current source causing a constant current flow through said differential amplifier, said differential amplifier being operative to provide current division in accordance with the amplitude differences of said combined signals; and electrical connections between said differential amplifier and said first and second transistors.

20. The predetection integration set forth in claim 13 further including first and second integration signal storage means respectively extending between said first and third and said second and fourth integration means, and current switching means alternately causing said capacitors to exchange integrating current or said slightly greater rate of current in alternately successive cycles.

21. The method of processing an amplitude-limited input digital signal having plural signal states and selectively changing signal states at the ends of successive time periods of the signal;

separately integrating said plural state portions of said input digital signal in each successive time period;

comparing said separately integrated signals at the end of each time period and supplying output signals in accordance with the signal relationships of said integrated signals;

the improved method steps including:

generating two independent integrated signals for each signal state in alternating successive time periods and returning said independently integrated signals toward a reference value during time periods intermediate said alternating time periods; and combining the two independently integrated signals for each signal state and supplying each combined signal as said integrated signal.

22. The method of claim 21 wherein said input digital signal may have more than one state change in each time period, generating a reference digital signal having predetermined cyclic signal state changes, logically combining said input and reference digital signal to produce a third digital signal having fewer state changes per time period than said input digital signal, and then integrating said third digital signal in place of integrating said input digital signal.

23. The method of claim 21 wherein the combining step includes forming the analog-OR signal of the two independently integrated signals for each signal state and differentially comparing said analog-OR signals and supplying said output signal in accordance with one of said analog-OR signals having a predetermined signal relationship to others of said analog-OR sums.

24. The method of claim 23 wherein based upon said differential comparison an output signal is supplied indicating that said one analog-OR signal has the greatest signal amplitude of a given polarity.

25. The method of claim 23 wherein based upon said differential comparison an output signal is supplied indicating whether or not two analog-OR signals have a given amplitude difference therebetween.

26. A digital signal detector including the combination:

first and second integrators, each integrator having + and − integration circuits;

data means supplying a first digital signal to said first integrator and a second digital signal to said second integrator;

clock means supplying + and − digital clock signals to said + and − integration circuits respectively for alternately activating said integration circuits to integrate said data signals; and means receiving said integrated signals and combining same in a predetermined manner and responsive to one of said clock signals to supply an output signal indicative of the signal relationships of said integrated signals.

27. The detector set forth in claim 26 wherein said integration circuits responsive to said + clock signal to integrate a digital signal being responsive only when said + clock signal is in a first signal state and when said clock signal is in a signal state other than said first signal state said + clock integration circuits altering its said integrated signals at a given rate toward a reference potential, said integration circuits responsive to said − clock signal to integrate a digital signal being responsive only when said − clock signal is in a first signal state and when said − clock signal is in a signal state other than said first signal state, said − clock integration circuits altering its said integrated signals at a given rate toward a reference potential, and said given rate being only slightly greater than the rate of integrating said digital signals.

28. The detector set forth in claim 27 wherein each integration circuit is operative to maintain an integrated signal whenever the respective input digital signal is not in a signal state to be integrated during the period of time such integration circuit is being activated to integrate such respective input digital signal.

29. The detector set forth in claim 28 wherein said clock means is responsive to one of said input digital signals to generate digital clock signals having a given periodicity and being symmetrical, said periodicity being such that integration of an input digital signal during one clock signal state reaching a maximum amplitude and said given rate altering such integrated maximum signal in about 75 percent of such integration time.

30. The detector set forth in claim 26 wherein said receiving means includes a differential comparison circuit, two summing means each combining two of said integrated signals and supplying such combined signals to the differential comparison circuit, said combining means activating said differential comparison circuit to supply an output signal each time said clock signals change signal states, and constant-current means supplying separate constant currents to said differential comparison circuit at an input receiving said combined signals, at an output for said output signal.

31. The digital signal detector set forth in claim 26 further including capacitor means extending between said + and said − integration circuits in said integrators, respectively, and receiving integration signals therefrom on a time-shared basis; and current exchanging means connected to said capacitors and said integration circuits and including switching means responsive to said clock means for alternately and successively connecting an integrating signal and a recovery signal for said integration circuit with respect to said capacitor means.

32. The data detector set forth in claim 31 wherein said clocking means comprises first and second semiconductor switching means alternately in conductive and nonconductive signal states; and said + integration circuits being connected to and responsive to the signal state of one of said semiconductive switch means and said − integration circuits being connected to and responsive to the signal state of the other of said semiconductive switch means.

33. A signal processing circuit for receiving first and second input signals to be compared;

clock means responsive to one of said signals to establish successive time period clock signals having a predetermined relationship to said input signals;

a first integrator having two first integration means and responsive to said first input signal and to said clock signals to integrate said first signal alternately in said first integration means, respectively, and to supply a first integrated output signal based upon the integrated signals in said first integration means;

a second integrator having two second integration means responsive to said second input signal and to said clock signal to integrate said second input signal alternatively in said second integration means, respectively, and to supply a second integrated output signal based upon the integrated signals in said second integration means; and output means receiving said output integrated signals and combining same to supply a signal in accordance with said combination.

34. The signal processing circuit set forth in claim 33 further including first and second integrated signal storage means respectively extending between said first and second integration means respectively alternately actuated for integrating; and switching means alternately actuating said integration means for effecting integration and squelching in successive time periods from said first and second integrators.

35. Synchronous demodulation employing integration, including the following steps in combination:

supplying a timing signal;

supplying data signals to be synchronously demodulated with respect to said timing signal;

combining said timing signal and said data signals to generate four distinct signal amplitudes including integrating said data signals with respect to said timing signals; and in timed relation to said timing signal, combining said distinct signal amplitudes into two signals and then amplitude comparing the two signals to generate an output signal timed by said timing signal and representing said data signal in a synchronous demodulated relation to said timing signal.

36. A pair of integrating circuits for use in a synchronous demodulation scheme comprising:

clocking control means;

first and second electronic switches responsive to first and second input signals for assuming conductive and nonconductive states and each having a connection to said clocking circuit for being alternately actuated thereby;

storage means extending between said first and second integrating circuits;

first and second current sources;

reversing switching means connected on opposite sides of said storage means and to said current sources, and responsive to said clock signal to alternately connect said current sources to opposite sides of said storage means in synchronous relationship to the received data signal whereby said storage means alternately exchanges integrating signals in accordance with the signal state of said switch and said clock and squelching signals in successive timed clock periods; and means receiving signals from the opposite sides of said capacitor for performing a function in accordance with the relative amplitudes thereof.

37. The circuit set forth in claim 36 wherein each of said integration switch means includes a pair of NPN transistor means, the emitter of one of said transistor means being connected to said clock means;

a resistor means extending between the collectors of said transistor means, and electrical connection between the collector of said one transistor means to a controlled portion of a second of said transistor means with the collector of said second transistor means being connected to a reference potential, and the emitter portion of said second transistor means being connected respectively to opposite end portions of said capacitor storage means, and said integrating current source being activated in timed relationship with said second transistor means being in a current nonconductive state in accordance with the data signal received by said integrating means and always being current conductive when said squelching current source is connected thereto; and means connected to supply data signals to said first one transistor means.

38. A synchronous demodulation circuit employing integration techniques including first and second ones of integrators constructed as set forth in claim 37 including additional clocking means for a second one of said integrators and alternately actuated with respect to the first-mentioned clocking means; and analog-OR means receiving signals from alternately actuated ones of said integrators for establishing two signals in successive time periods alternately supplied by said alternately actuated integration means, and means in said receiving means for comparing signal amplitudes for establishing an output signal having a synchronous demodulated relationship to said clock signal based upon the receipt of said data signal whereby noise is eliminated from said data signal.

39. An electrical signal processing circuit, including in combination:

means for differentially receiving a signal to be processed;

a differentially operating time circuit for defining successive time periods of signal processing;

first and second differentially connected switches each with first and second differential inputs and outputs differentially receiving said signal to be processed, and said switches being alternately actuated in said successive time periods between electrical current conductive and nonconductive states by said timing circuit and further responsive to said signal to be processed to alter one of said states;

integration signal storage means extending between said outputs of said differentially connected switches, respectively; and means for detecting electrical signals in said storage means in timed relation to said time periods.

40. The electrical signal processing circuit of claim 39 further including in combination:

two differential amplifier means having differential input portions respectively connected across said storage means and supplying output signals in accordance therewith; and analog-OR mixing means combining signals from said amplifier means in a predetermined manner and supplying mixed signals to said detecting means.

41. The electrical signal processing circuit of claim 39 further including in combination:

integrating current source means and squelch current source means; and reversing switching means connecting said source means to said storage means in alternating reverse connections on opposite ends thereof in timed relation with said responsiveness to said signal to be processed of differentially connected switches such that said squelch current means is continuously acting on said storage means but in opposite electrical senses during successive periods of time in accordance with said timing circuit.

42. A data detector, including in combination:

means for receiving a data signal having plural signal states to be detected;

timing means repeatedly establishing first and second successive detection periods;

first and second integration means respectively responsive to said data signal during said first and second detection periods to integrate a first signal state portion of said data signal and respectively during said second and first detection periods adjusting its integration state toward a reference integration state, and each supplying an integrated signal indicative of its respective integration states; and output means combining said integrated signals to a combined signal and responsive to said timing means and said combined signal to indicate data in accordance with said combined signal.

43. The data detector set forth in claim 42 further including means in said output means for detecting the amplitude of the integrated signal output from said integration means and supplying said combined signal in accordance with said detection for indicating value of the bit in each said detection period.

44. The apparatus of claim 43 further comprising means for generating said binary input signal from phase encoded data signals including in combination:

said timing means including a variable frequency clock for generating a clock signal slaved to said phase enclloded data signal, each clock cycle of said clock signal representing one of said bit periods of said phase encoded data signal and said binary input signal and equal in duration to said detection period; and an exclusive-OR circuit receiving said clock signal and said phase encoded data signal to generate said data signal.

45. The apparatus of claim 43 further including in combination:

said clock supplying complementary first and second clock signals;

first AND gate means coupled between the output of said exclusive-OR means and said first integration means, said first AND gate means being enabled by said first clock signal so as to enable said first AND gate means during said first ones detection periods; and second AND gate means coupled between the output of said exclusive-OR means and said second integration means, said second AND gate means being coupled to and enabled by a second clock signal so as to enable said second AND gate means during said second detection periods.

46. The apparatus of claim 45 wherein said first integration means and said second integration means each comprise:

integration circuit elements; and switch means responsive to the output of the respective AND gate means and said complementary clock signals, said switch means applying a signal for integration to the input of said integrating circuit elements during said first and second detection periods and supplying a signal to adjust said integration states in said circuit elements, respectively, in said second and first detection periods.

47. A circuit for integrating a binary input signal comprising a series of bit cells having fixed bit periods, said bit cells being spaced from one another by at least one bit period, said circuit comprising:

an integrating means generating an output signal representing the integration of said input signal during said bit cells, means returning said output signal to a squelch level between said bit cells;

clock means supplying a clock signal identifying said bit periods; and a switch means responsive to said input signal and said clock signal representing the spacing of said bit cells and supplying a signal for integration to said integration means during said bit periods of said bit cells and supplying a signal to squelch said integration means between said bit cells.

48. A pair of the circuits of claim 47 wherein the bit cells of one binary signal for one of said circuits are displaced in time with respect to the bit cells of another binary input signal for the other of said circuits.

49. A method of detecting bits in a phase encoded data signal comprising a series of bit cells read from a magnetic tape, said method including the steps of:

generating a variable frequency clock signal slaved to said phase encoded input data, one cycle of said variable frequency clock signal corresponding to one bit cell of said phase encoded data signal;

comparing the phase of said clock signal with the phase of said data signal;

generating a binary signal having one value when the phases in a bit cell are the same and another value when the phases in the bit cell are opposite;

dividing said binary signal into two binary signals, the first of said signals comprising alternate bit cells containing both binary values and the second of said signals comprising said succeeding alternate bit cells, containing both binary values;

integrating said first binary signal during alternate bit cells with a first integrating means and squelching said first integrating means during said succeeding alternate bit cells; and integrating said second binary signal during said succeeding alternate bit cells with a second integrating means and squelching said second integrating means during said alternate bit cells.

50. The method of claim 49 further including the step of:

dividing said binary signal into complementary binary signals, the first of said complementary binary signals occurring during said alternate bit cells and the second of said signals occuring during said succeeding alternate bit cells, said first complementary binary signal and said second complementary binary signal being integrated by said first integrator and said second integrator, respectively.

51. Apparatus for integrating a binary input signal read from a magnetic tape comprising a series of bit cells including:

a clock means synchronized with said bit cells of said binary signal;

a means for dividing said input signal into a first binary signal comprising a first set of said bit cells representing both binary values and a second binary signal comprising a second set of said bit cells representing both binary values, the respective bit periods for bit cells in said first set lying between the respective bit periods for bit cells in said second set;

a first integrating means having said first binary signal applied to the input thereof, said first integrating means integrating said first binary signal during said first set of bit cells irrespective of the binary values of said bit cells, said clock means being coupled to said first integrating means for controlling integration of said binary signal during said first set of bit cells in said series, said clock means also controlling squelching of said first integrating means so as to squelch said first integrating means during said second set of bit cells;

a second integrating means having said second binary signal applied to the input thereof, said second integrating means integrating said second binary signal during said second set of bit cells irrespective of the binary values of said bit cells, said clock means being coupled to said second integrating means for controlling integration of said binary signal during said second set of bit cells in said series, said clock means also controlling squelching of said second integrating means so as to squelch said second integrating means after said second set of bit cells; and a means coupled to said first integrating means and said second integrating means for detecting the level of the integrated binary signals for each bit cell in said first set and said second set to determine the value of the bit in each bit cell.

52. The apparatus of claim 51 further comprising:

a source of phase encoded data, said clock means including a variable frequency oscillator means coupled to the output of said source for generating a clock signal slaved to said phase encoded data, each clock cycle of said clock signal representing a bit period for a bit cell of said phase encoded data and said binary input signal; and an exclusive-OR means coupled to said source and said oscillator means for generating said binary input signal from said clock signal and said phase encoded data.

53. The apparatus of claim 52 wherein said clock means further includes a flip-flop means coupled to said oscillator means and set by said clock signal, said apparatus further comprising:

a first AND gate means coupled between said exclusive-OR means and said first integrating means, said first AND gate being coupled to and enabled by a first output of said flip-flop means so as to enable said first AND gate means during said first set of bit cells; and a second AND gate means coupled between said exclusive-OR means and said second integrator means, said second AND gate means being coupled to and enabled by a second output of said flip-flop means so as to enable said second AND gate means during said second set of bit cells.

54. The apparatus of claim 53 wherein said first integrating means and said second integrating means each comprise:

an integrating circuit element; and a switch means coupled to the output of the respective AND gate means, said flip-flop means, and said integrating circuit element, said switch means applying a signal for integration to the input of said integrating circuit element during bit periods of said bit cells in one of said sets and applying a signal to squelch said integrating circuit element between the bit cells in said one set.

55. A signal processing circuit for a received signal representing data in successive bit periods by successive given signal-state change characteristics, the improvement including in combination:

a clock responsive to said received signal to establish first and second alternating successive data detection period control signals;

a first integrator jointly responsive to said first control signal and to said received signal to supply an output signal indicative of the relationship therebetween in each first detection period;

a second integrator jointly responsive to said second control signal and to said received signal to supply an output signal indicative of the relationship therebetween in each second detection period;

an output circuit receiving and combining said output signals to supply a single output signal indicative of the relationship of said control signals to said received signal during each detection period; and means in each said first and second integrators reestablishing a reference integration state respectively during said second and first detection periods.

* * * * *